United States Patent
Ohtsuka

(10) Patent No.: US 9,682,521 B2
(45) Date of Patent: Jun. 20, 2017

(54) METAL MOLD FORMING METHOD FOR INDOOR ILLUMINATING LAMP LENS FOR MOTOR VEHICLE AND INDOOR ILLUMINATING LAMP LENS

(71) Applicant: YAZAKI CORPORATION, Tokyo (JP)

(72) Inventor: Haruhito Ohtsuka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 366 days.

(21) Appl. No.: 13/870,608

(22) Filed: Apr. 25, 2013

(65) Prior Publication Data

US 2013/0229818 A1    Sep. 5, 2013

Related U.S. Application Data

(63) Continuation of application No. PCT/JP2011/080562, filed on Dec. 22, 2011.

(30) Foreign Application Priority Data

Dec. 24, 2010    (JP) .................................. 2010-288102

(51) Int. Cl.
*B29D 11/00*    (2006.01)
*B29C 45/38*    (2006.01)
(Continued)

(52) U.S. Cl.
CPC .......... *B29D 11/0074* (2013.01); *B29C 45/38* (2013.01); *F21S 48/00* (2013.01);
(Continued)

(58) Field of Classification Search
CPC ................ B29C 45/2708; B29C 45/38; B29C 2045/384; B29D 11/0074; B29L 2011/0016; B29L 2031/30
See application file for complete search history.

(56) References Cited

U.S. PATENT DOCUMENTS 6,027,328 A    2/2000  Herbst
6,495,077 B1   12/2002 Ishikawa
(Continued)

FOREIGN PATENT DOCUMENTS

CN    1287050 A    3/2001
JP    53-141364    12/1978
(Continued)

OTHER PUBLICATIONS

German Office Action for the related German Patent Application No. 11 2011 104 510.7 dated May 15, 2014 with English language translation thereof.
(Continued)

*Primary Examiner* — Mathieu Vargot
(74) *Attorney, Agent, or Firm* — Kenealy Vaidya LLP

(57) ABSTRACT

A metal mold forming method for an indoor illuminating lamp lens for a motor vehicle using a metal mold having a cavity having a form of the indoor illuminating lamp lens to be provided with an entire surface as a designed part, the indoor illuminating lamp lens having a prescribed thickness and a rib in a back surface thereof, comprises providing a gate to the rib and the thickness, injecting a molten resin into the cavity of the metal mold from the gate, separating the rib from the gate by inserting a cut pin having a same width as a width of the gate into the rib and the gate at a root of the gate after the step of injecting is completed, and taking out the lens from the metal mold by moving the cut pin backward after the step of separating is completed.

3 Claims, 7 Drawing Sheets

(51) Int. Cl.
*F21S 8/10* (2006.01)
*F21V 5/04* (2006.01)
*B29C 45/27* (2006.01)
*B29L 11/00* (2006.01)
*B29L 31/30* (2006.01)

(52) U.S. Cl.
CPC ............ *F21V 5/04* (2013.01); *B29C 45/2708* (2013.01); *B29C 2045/384* (2013.01); *B29L 2011/0016* (2013.01); *B29L 2031/30* (2013.01)

(56) References Cited

U.S. PATENT DOCUMENTS

| | | |
|---|---|---|
| 2005/0258764 A1 | 11/2005 | Nagai et al. |
| 2006/0007689 A1 | 1/2006 | Okabe et al. |
| 2010/0047500 A1* | 2/2010 | Arai ............................... 428/43 |

FOREIGN PATENT DOCUMENTS

| JP | 59-79739 A | 5/1984 |
|---|---|---|
| JP | 6-106584 A | 4/1994 |
| JP | 9-174621 A | 7/1997 |
| JP | 2001-9878 A | 1/2001 |
| JP | 2005-238966 A | 9/2005 |
| JP | 2005-329883 A | 12/2005 |
| JP | 2006-21656 A | 1/2006 |
| JP | 2008-114408 A | 5/2008 |
| WO | 2010/061728 A1 | 6/2010 |

OTHER PUBLICATIONS

Database WPI; Week 197904; Thomson Scientific; London,GB; AN 1979-06582B; XP002676838; JP53 141364A (Yoshino Kogyosho Co Ltd); Dec. 9, 1978.
International Search Report and Written Opinion of the International Search Report for PCT/JP2011/080562 dated Jun. 22, 2012.
Korean Office Action for the related Korean Patent Application No. 10-2013-7013200 dated Apr. 28, 2014.
Chinese Office Action for the related Chinese Patent Application No. 2011800565675 dated Aug. 22, 2014.
Japanese Office Action for the related Japanese Patent Application No. 2010-288102 dated Jul. 3, 2014.
German Office Action for the related German Patent Application No. 11 2011 104 510.7 dated Oct. 28, 2016.

* cited by examiner

Fig.7(A)(1) 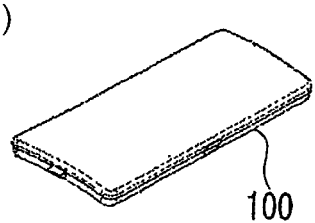
Fig.7(A)(2) 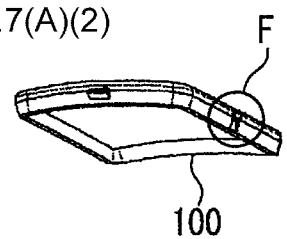

Fig.7(C)(1) 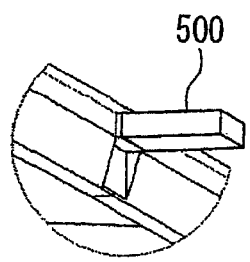
Fig.7(C)(2) 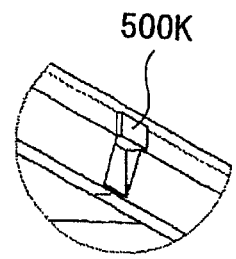

METAL MOLD FORMING METHOD FOR INDOOR ILLUMINATING LAMP LENS FOR MOTOR VEHICLE AND INDOOR ILLUMINATING LAMP LENS

CROSS REFERENCE TO RELATED APPLICATION

This application is a continuation of PCT application No. PCT/JP2011/080562, which was filed on Dec. 22, 2011 based on Japanese Patent Application No. 2010-288102 filed on Dec. 24, 2010, the contents of which are incorporated herein by reference. Also, all the references cited herein are incorporated as a whole.

BACKGROUND OF THE INVENTION

1. Field of the Invention

The present invention relates to an indoor illuminating lamp lens for a motor vehicle, and more particularly to a metal mold forming method for an indoor illuminating lamp lens for a motor vehicle and an indoor illuminating lamp lens in which a dimension is easily controlled and there is no fear that scars are left on a ceiling.

2. Description of the Related Art

An indoor illuminating lamp for a motor vehicle including a lens, a housing, a ceiling and a lamp unit is usually known in which the housing having the lamp unit to which the lens is attached is attached to a reinforcement through the ceiling (see JP-A-2005-238966).

FIGS. 6(A) and 6(B) are perspective views for explaining an indoor illuminating lamp for a motor vehicle to which the present invention is applied. FIG. 6(A) is an exploded view and FIG. 6(B) is a view of an assembled state in which an attachment is completed.

In FIG. 6(A), the indoor illuminating lamp is formed by a lens 10, a housing 20, a ceiling 30 and a lamp unit in order from an upper part.

Now, these components will be briefly described below.

<Lens 10>

The lens 10 is a resin member having a function of a lens for passing lights from a lamp 40L of the lamp unit 40 fixed to the housing 20. The lens 10 has a rectangular shape gently curved in one direction in the form of a barrel and ribs 10B (FIG. 1(B)) standing upright over 360° of the periphery of a back side thereof. In the vicinity of the ribs 10B or between the ribs, lock engaging holes 10R are provided and the lock engaging holes 10R are engaged with lock pawls 20R of the housing 20.

<Housing 20>

The housing 20 is a resin member including an upright wall 20W circulated in a rectangular shape and a bottom plate 20B that closes about half of a bottom opening surrounded by the upright wall 20W. The upright wall 20W is provided with the lock pawls 20R on side surfaces which are engaged with the lock engaging holes 10R of the lens 10 and a plurality of lock pawls 20T in an extending direction of the upright wall 20W which are engaged with a plurality of lock engaging holes of a reinforcement located in the ceiling side in a vehicle. To the bottom plate 20B, the lamp unit 40 is fixed.

<Ceiling 30>

The ceiling 30 is formed with a frame shaped resin member in plan view which forms a ceiling part when an indoor illuminating lamp for a motor vehicle is attached to an upper part of the vehicle, and includes a flat bottom surface part 30P of an inner side peripheral edge of a central opening 30L, an inclined surface part 30S obliquely standing from an end of the bottom surface part 30P and a top surface part 30T extending horizontally from a top part of the inclined surface part 30S.

<Lamp Unit 40>

The lamp unit 40 has the lamp 40L and is turned on by a signal from the vehicle. The lamp unit 40 is fixed to the bottom plate 20B of the housing 20 so that the lamp 40L protrudes from the bottom plate 20B.

<Attachment of Indoor illuminating Lamp>

In attaching the above-described components to the vehicle, initially, the lock pawls 20R of the housing 20 are engaged with the lock engaging holes 10R of the lens 10 (FIG. 6(A)) to attach the lens 10 to the housing 20. Then, the housing 20 is attached to the lamp unit 40 through the ceiling 30. Thus, the indoor illuminating lamp 1 for the motor vehicle is completed as shown in FIG. 6(B).

Then, the lock pawls 20T of the housing 20 of the indoor illuminating lamp 1 for the motor vehicle are engaged with the lock engaging holes of the reinforcement of the vehicle to attach the indoor illuminating lamp 1 for the motor vehicle to the vehicle.

<Usual Forming Method of Lens>

FIGS. 7(A)(1), 7(A)(2), 7(B), 7(C)(1), and 7(C)(2) are perspective view of a usual forming method of a lens. FIG. 7(A)(1) is a perspective view of the lens seen from a front side. FIG. 7(A)(2) is a perspective view of the lens seen from a back side. FIG. 7(B) is a perspective view showing a state that a molten resin is injected into a metal mold from a gate. FIG. 7(C)(1) shows the lens before the gate attached to the molded lens is cut by a nipper. FIG. 7(C) (2) shows the lens after the gate is cut by the nipper.

The lens 100 formed by the usual forming method is a rectangular resin member curved gently in one direction in the form of a barrel as shown in FIG. 7(A)(1). When the lens 100 is seen from the back side, such a gate mark as surrounded by a round mark F shown in FIG. 7(A)(2) is formed. FIG. 7(C)(2) is an enlarged view of the round mark F of FIG. 7(A)(2) to show that the gate mark 500K is formed. A reason why the gate mark 500K is formed and problems caused from the gate mark will be described below.

(Reason Why Gate Mark is Formed)

In order to injection mold the lens 100 as shown in FIGS. 7(A) and 7(B), initially, a metal mold is manufactured which has a cavity with the form of the lens 100 therein.

Then, an injection passage (a gate) 500 is formed for injecting the molten resin into the cavity of the metal mold to inject the molten resin into the cavity of the metal mold from the gate 500 in a direction shown by a void arrow mark in FIG. 7(B).

When the molten resin is injected into the cavity of the metal mold, the lens 100 and the gate 500 are solidified under a state that the lens 100 is integrally formed with the gate 500.

After the molten resin is solidified, when the lens 100 and the gate 500 are taken out from a molding machine, a molded product having the lens 100 formed integrally with the gate 500 is obtained as shown in FIG. 7(C)(1).

Thus, when a root part of the gate 500 is cut by a nipper to separate the gate 500 from the lens 100, the lens 100 with the gate mark 500K having a remainder of the gate as shown in FIG. 7(C)(2) is obtained.

<Problem of Lens 100 with Gate Mark>

As described above, in the usual lens 100, since the gate 500 shown in FIG. 7(C)(1) is cut by the nipper, the gate mark 500K shown in FIG. 7(C)(2) has a large gate emerging margin. Accordingly, the large gate emerging out margin of the gate mark 500K is greatly uneven and hardly dimensionally controlled.

Further, when the gate 500 is cut by the nipper, there is a fear that a designed surface of the lens 100 may be possibly broken.

Further, since the gate 500 is cut by the nipper, there is a possibility that a sharp configuration may be formed on a cut surface of the gate mark 500K. In the case of an entire surface lens, there is possibility that a ceiling may be possibly marred by the sharp cut surface.

SUMMARY OF THE INVENTION

The present invention has been made in view of these situations and possibilities. It is an object of the present invention to provide an indoor illuminating lamp lens for a motor vehicle which can be easily dimensionally controlled and has no possibility of marring a ceiling.

A first aspect of the present invention relates to a metal mold forming method for an indoor illuminating lamp lens for a motor vehicle using a metal mold having a cavity having a form of the indoor illuminating lamp lens to be provided with an entire surface as a designed part, the indoor illuminating lamp lens having a prescribed thickness and a rib in a back surface thereof, the method comprising steps of providing a gate to the rib and the thickness, injecting a molten resin into the cavity of the metal mold from the gate, separating the rib from the gate by inserting a cut pin having a same width as a width of the gate into the rib and the gate at a root of the gate after the step of injecting is completed, and taking out the lens from the metal mold by moving the cut pin backward after the step of separating is completed.

In a second aspect of the present invention according to the first aspect, a crepe work is applied to an end of the cut pin in the first invention.

A third aspect of the present invention relates to an indoor illuminating lamp lens that has a prescribed thickness and an entire surface to be formed as a designed part, wherein a gate setting surface formed by inserting a cut pin to a part of the thickness during a molding has a surface difference applied so as to be lower than a lens control surface as a back surface of the thickness.

As described above, according to the first aspect of the present invention, since the cut pin having the same width as the width of the gate into the rib and the gate at the root part of the gate after the injection is completed to separate the rib from the gate, the lens can be obtained in which a dimensional control is more easily carried out than a usual method that the gate part is cut by the nipper and there is no fear of marring the ceiling.

According to the second aspect of the present invention, since the crepe work is applied to the end of the cut pin, the crepe work can be simply applied to the gate setting surface.

According to the third aspect of the present invention, since the gate setting surface has the surface difference so that the gate setting surface is recessed more than the lens control surface, when the lens is attached to the ceiling, a clearance formed between the lens and the ceiling can be reduced.

BRIEF DESCRIPTION OF DRAWINGS

FIGS. 4(B)(1) and (B)(2) show the usual lens. FIG. 4(B)(1) is a perspective view showing a part in the vicinity of a gate. FIG. 4(B)(2) is a sectional view taken along a line B-B of the usual lens in FIG. 4(A). FIG. 4(C)(1) and (C)(2) show the lens according to the present invention. FIG. 4(C)(1) is a perspective view showing a part in the vicinity of a gate. FIG. 4(C)(2) is a sectional view taken along a line B-B of the lens according to the present invention shown in FIG. 4(A).

FIG. 5(2) is an enlarged view of a round mark D shown in FIG. 5(1). FIG. 5(3) shows a specific example of a lens cut C applied to the entire part of the front side of the lens. FIG. 5(4) is a perspective view of an entire part of a back side of the lens. FIG. 5(5) is an enlarged view of a round mark E shown in FIG. 5(4).

FIG. 6(A) is an exploded view and FIG. 6(B) is a view of an assembled state in which an attachment is completed.

FIGS. 7(A)(1), 7(A)(2) and FIG. 7(B), 7(C)(1) and 7(C)(2) are perspective views of a usual forming method of a lens. FIG. 7(A)(1) is a perspective view of the lens seen from a front side. FIG. 7(A)(2) is a perspective view of the lens seen from a back side. FIG. 7(C)(1) shows the lens before the gate attached to the molded lens is cut by a nipper. FIG. 7(C)(2) shows the lens after the gate is cut by the nipper.

DESCRIPTION OF THE PREFERRED EMBODIMENTS

Now, a metal mold forming method for an indoor illuminating lamp lens for a motor vehicle according to the present invention will be described below which is easily dimensionally controlled and has no fear of marring a ceiling.

<Feature of Lens According to the Present Invention>

A lens 10 shown in FIG. 1 is manufactured by an injection molding of a molten resin similarly to a usual lens, however, different from the usual lens in view of a point that the lens 10 is formed by an overlap forming method. When the lens 10 is formed by the overlap forming method, the lens 10 is characterized in that a gate setting surface 10G of the lens 10 is arranged so as to be lower by one step than a lens control surface 10N.

Figure 1A:
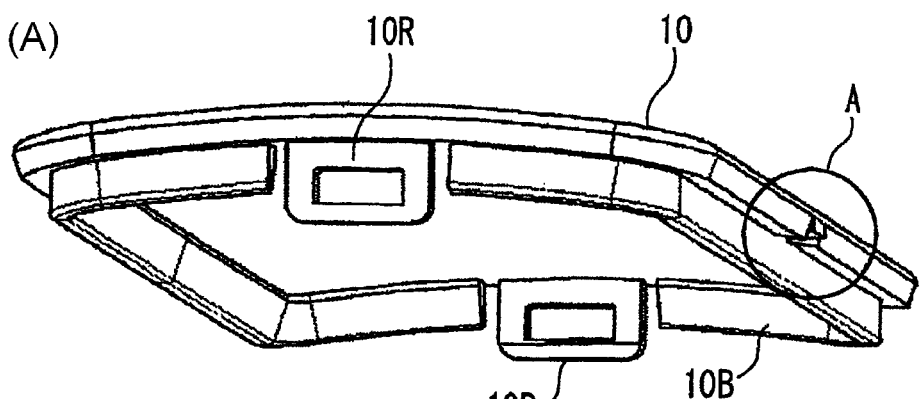
FIG. 1(A) is a perspective view of an indoor illuminating lamp lens for a motor vehicle according to the present invention which is looked upward from a lower part.
Figure 1B:
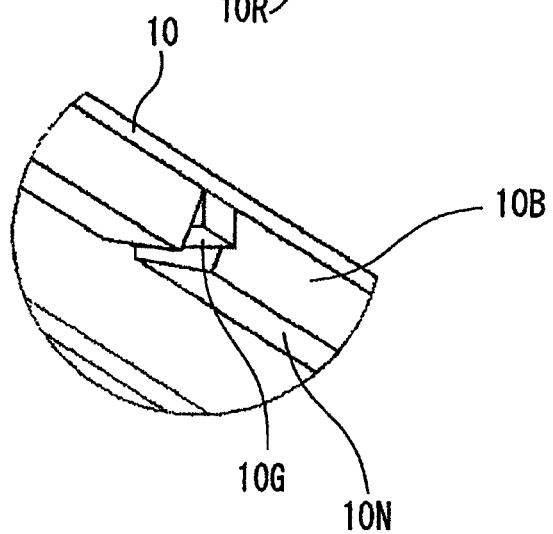
FIG. 1(B) is an enlarged view of a part surrounded by a circle A in FIG. 1(A).

Namely, in the enlarged view of a gate part shown in FIG. 1(B), it is recognized that the gate setting surface 10G of the lens 10 is recessed more by one step than the lens control surface 10N.

<Overlap Forming Method Used by the Present Invention>

Figure 2:
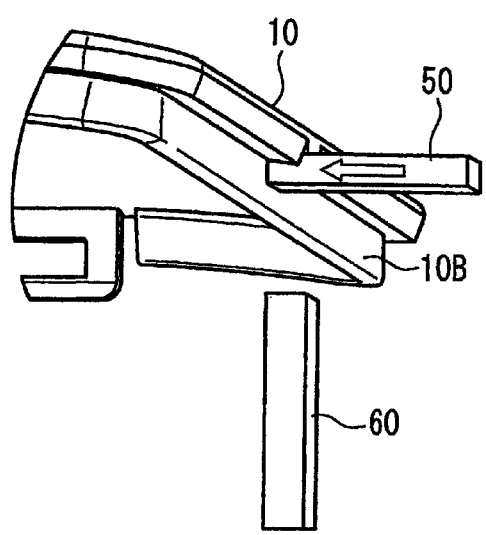
FIGS. 2(1) and 2(2) are perspective views of the first half for explaining an overlap forming method.
Figure 2:
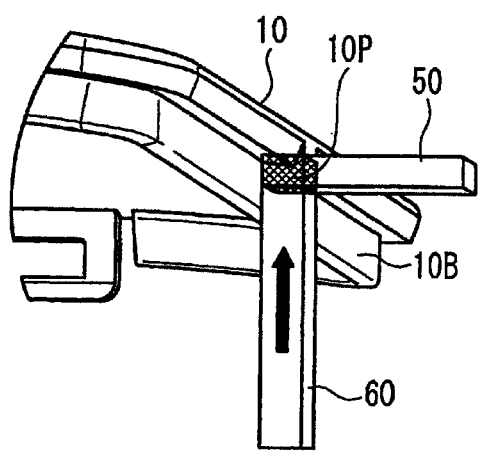
Figure 3:
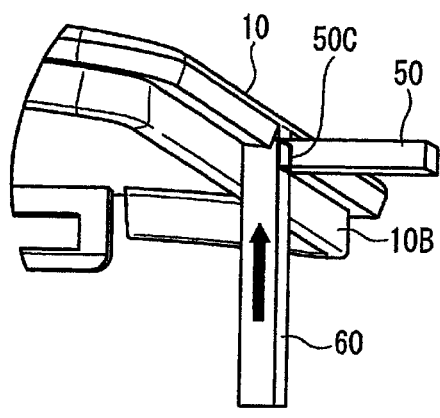
FIGS. 3(1) and 3(2) are perspective views of the latter half for explaining the overlap forming method.
Figure 3:
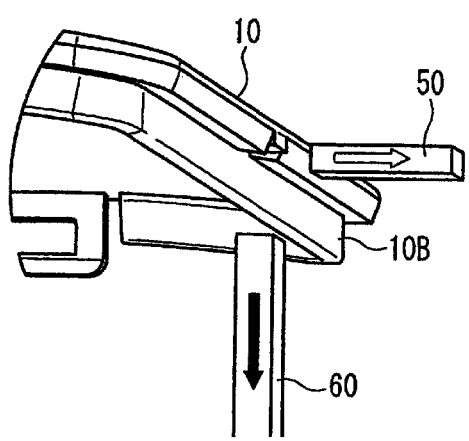

FIGS. 2(1) and 2(2) and FIGS. 3(1) and 3(2) are views for explaining the overlap forming method, and the overlap forming method is carried out in order of FIGS. 2(1), FIG.

2(2), FIG. 3(1) and FIG. 3(2). The overlap forming method itself can be carried out by referring to the invention disclosed in, for instance, JP-A-H9-141708.

(1) <Injection of Resin>

In FIG. 2(1), the lens 10 is provided with a rib 10B over 360° of a periphery of a back side thereof. A metal mold having therein a cavity with such a form of the lens 10 is manufactured. Then, an injection passage (a gate) is formed for injecting a molten resin into the cavity of the metal mold. When the molten resin is injected into the cavity of the metal mold from the gate 50 in a direction shown by a void arrow mark, the lens 10 and the gate 50 are solidified under a state that the lens 10 is integrally formed with the gate 50, so that the entire part of the lens 10 is formed. A cut pin 60 which can make an access to a root part of the gate in the cavity is located in the metal mold and still stands by. The cut pin 60 has the same width as the width of the gate 50, so that the cut pin 60 is adequately inserted into the width of the gate 50.

(2) <Press-In of Cut Pin 60>

Then, in FIG. 2(2), when the injection of the molten resin is completed, the waiting cut pin 60 operates in a direction shown by a black arrow mark so that a resin press-in part 10P of the molten resin of the gate in the vicinity of the rib 10B is pressed-in to the rib 10B of the lens 10.

(3) <Separation of Rib 10B From Gate 50>

Then, in FIG. 3(1), when the molten resin is pressed-in to the resin press-in part 10P by the cut pin 60, the rib 10B of the lens 10 is simultaneously separated from the gate 50 by a gate cut part 50C of the gate 50. At this time, since the gate cut part 50C is separated from the lens 10, a gate cut mark is not left.

(4) <Return of Cut Pin 60>

Finally, in FIG. 3(2), after the gate is completely cut, the cut pin 60 is returned in a direction shown by a black arrow mark, then, the gate is separated and only the lens 10 is taken out from the metal mold.

In the lens 10 taken out from the metal mold in such a way, an entire form is obtained as shown in FIG. 1(A). In a position where the gate is located, the gate setting surface 10G of the lens 10 is recessed more by one step than the lens control surface 10N as shown in FIG. 1(B).

<Reason Why Gate Setting Surface 10G is Preferably Recessed More than Lens Control Surface 10N>

Figure 4A:
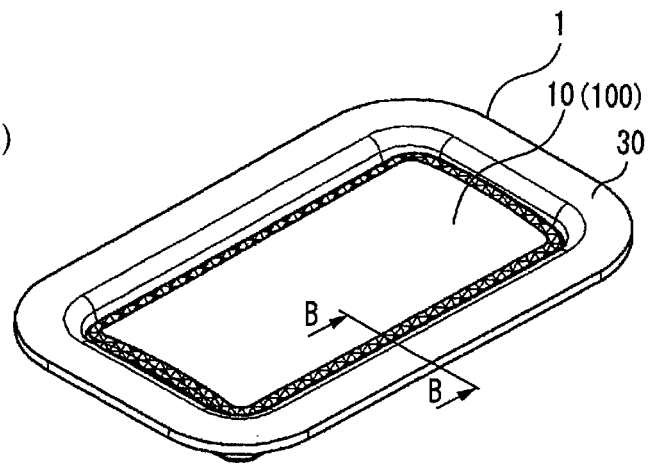
FIG. 4(A) is a perspective view of an indoor illuminating lamp for the motor vehicle in which an attachment is completed and shows an illuminating lamp to which a usual lens is attached and an illuminating lamp to which the lens according to the present invention is attached at the same time.
Figure 4A:
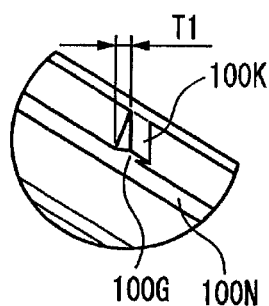
Figure 4A:
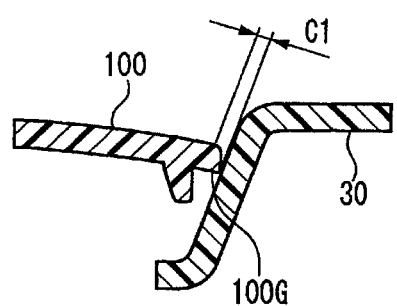
Figure 4A:
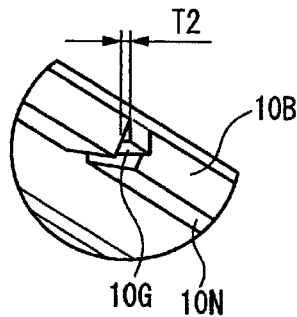
Figure 4A:
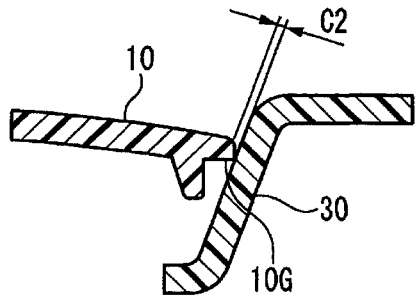

FIGS. 4(A), 4(B)(1), 4(B)(2), 4(C)(1), and 4(C)(2) are views for explaining a reason why the gate setting surface 10G is preferably recessed more than the lens control surface 10N. FIG. 4(A) is a perspective view of an indoor illuminating lamp for the motor vehicle in which an attachment is completed and shows an illuminating lamp to which the usual lens 100 is attached and an illuminating lamp to which the lens 10 according to the present invention is attached at the same time.

FIGS. 4(B)(1) and (B)(2) show the usual lens 100. FIG. 4(B)(1) is a perspective view showing a part in the vicinity of a gate. FIG. 4(B)(2) is a sectional view taken along a line B-B of the usual lens in FIG. 4(A). FIGS. 4(C)(1) and (C)(2) show the lens 10 according to the present invention. FIG. 4 (C)(1) is a perspective view showing a part in the vicinity of a gate. FIG. 4(C)(2) is a sectional view taken along a line B-B of the lens according to the present invention shown in FIG. 4(A).

In FIG. 4(B)(1), since a gate setting surface 100G of the usual lens 100 is the same as a lens control surface 100N, the gate emerging margin has a width of T1. When such a lens 100 is attached to the ceiling 30, the gate setting surface 100G of the lens 100 pushes in the ceiling 30 form a large clearance C1 (a gap) between the lens 100 and the ceiling 30.

As compared therewith, in FIG. 4(C)(1), since the gate setting surface 10G of the lens 10 according to the present invention is recessed more by one step than the lens control surface 10N, a gate emerging margin has a width T2 smaller than the usual width T1 (T1>T2). When such a lens 10 is attached to the ceiling 30, an amount that the gate setting surface 10G pushes in the ceiling 30 is reduced, so that only a small clearance C2 (C1>C2) is formed between the lens 10 and the ceiling 30.

<Crepe Work Can Be Applied to End of Cut Pin>

Figure 5:
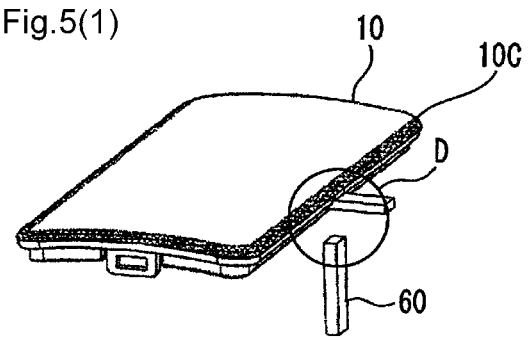
FIG. 5(1) is a perspective view of an entire part of a front side of the lens.
Figure 5:
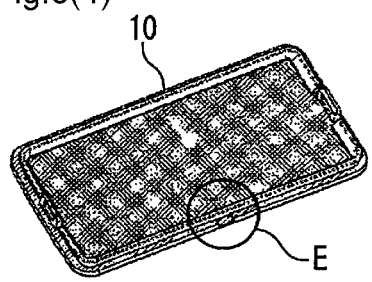
Figure 5:
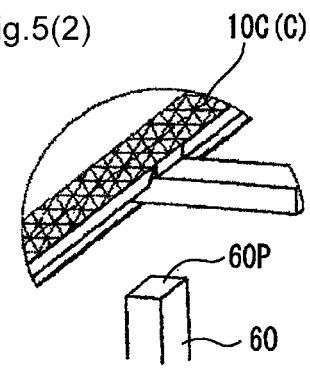
Figure 5:
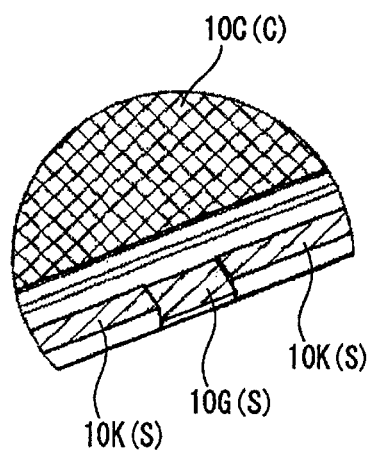
Figure 5:
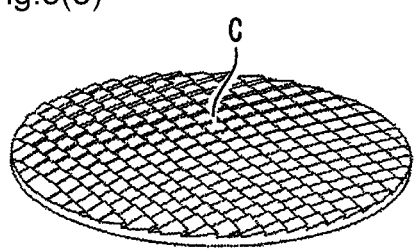
Figure 6A:
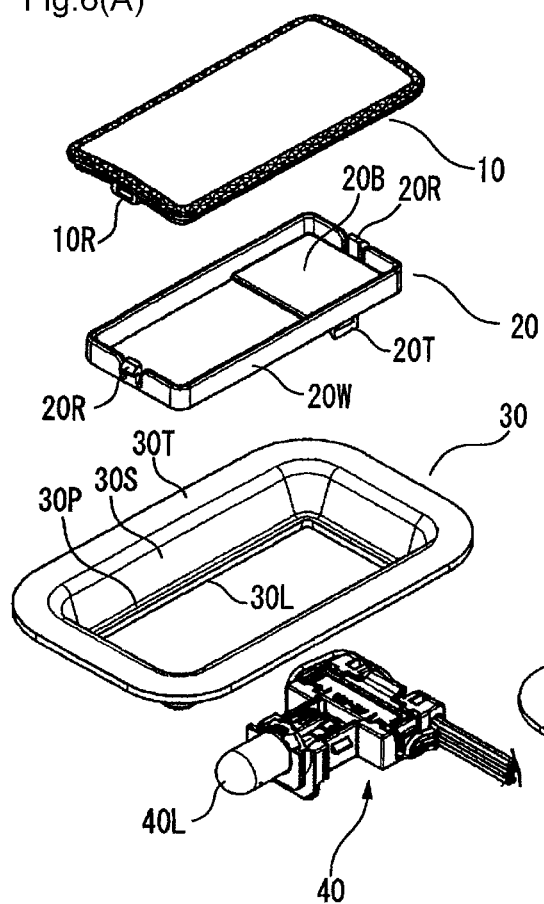
FIGS. 6(A) and 6(B) are perspective views for explaining an indoor illuminating lamp for a motor vehicle to which the present invention is applied.
Figure 6B:
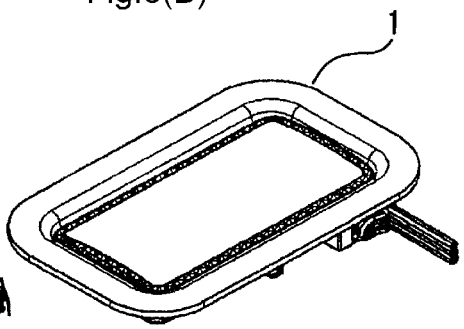
Figure 7B:
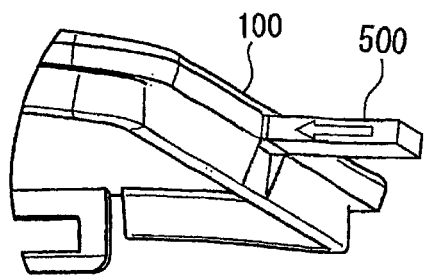
FIG. 7(B) is a perspective view showing a state that a molten resin is injected into a metal mold from a gate.

FIG. 5(1) is a perspective view of an entire part of a front side of the lens. FIG. 5(2) is an enlarged view of a round mark D shown in FIG. 5(1). FIG. 5(3) shows a specific example of a lens cut C applied to the entire part of the front side of the lens. FIG. 5(4) is a perspective view of an entire part of a back side of the lens. FIG. 5(5) is an enlarged view of a round mark E shown in FIG. 5(4).

To a periphery 10C (FIG. 5(1)) of the front side of the lens 10 as a designed surface, a work of the lens cut C is applied as shown in FIG. 5(2).

Further, to the entire surface of the back side of the lens 10, as shown in FIG. 5(4) and FIG. 5(5), a crepe work S that applies a skin, a pear skin, a grain and a texture thereto or the lens cut work C is applied, so that even when flaws are formed on the back surface of the lens, the flaws are hardly seen to improve an outward appearance.

Further, a smooth surface having no crepe is slippery, however, when the crepe work S or the lens cut work C is applied to the lens, the lens is easily held to improve a workability.

Further, since the crepe work S is applied to the periphery of the back side of the lens 10, an inner side of the lens is prevented from being seen.

In the lens 10 according to the present invention, since the gate setting surface 10G is recessed more by one step than the lens control surface 10N to which the crepe work S is applied, even when the crepe work is not applied to the lens control surface 10N, the gate setting surface 10G hardly attracts attention.

Further, since the crepe work S can be applied to an end 60P of the cut pin 60 shown in FIG. 5(1), when the crepe work S is applied to the end 60P of the cut pin 60, the crepe work S can be simply formed in the gate setting surface 10G as shown in FIG. 5 (5), and the lens cut C and the crepe work S can be simply applied to an entire area of a designed back surface.

<Summary>

When the lens 100 is formed by the usual technique, the gate 500 is cut by the nipper. Accordingly, the lens control surface 100N is flush with the gate setting surface 100G, so that when the lens is attached to the ceiling, the large clearance is firmed. Further, since a nipping work is hardly uniformly carried out, it is difficult to control the remainder of the gate. As described in FIGS. 2 (1) and 2(2) and FIGS. 3(1) and 3(2), since an overlap gate is used, even when the gate is arranged in a mating face of the lens 10 and the ceiling 30, a ceiling lapping amount is easily dimensionally controlled. Further, as shown in FIG. 1(B), since the gate setting surface 10G has a surface difference from the lens control surface 10N, an entire surface lens of the indoor illuminating lamp for the motor vehicle can be formed without deteriorating a design property.

Further, since a cut part of the gate 50 by the nipper is not formed in the lens 10, the ceiling 30 is not marred.

Further, since the gate setting surface 10G is recessed more than the lens control surface 10N, even when the crepe work is not applied to the lens control surface 10N, the gate setting surface 10G does not attract attention.

Further, since the crepe work can be applied to the end 60P of the cut pin 60 shown in FIG. 5(1), when the crepe work is applied to the end 60P of the cut pin 60, the crepe work can be applied to the gate setting surface 10G (FIG. 5(4)). The above-described work is applied respectively to the lens cut C of the designed part of the surface of the lens and the lens cut C and the crepe work S of the back surface of the lens, so that the form of the gate part is not seen and a unification of the deign property can be obtained.

This application is based upon and claims the benefit of the priority Japanese Patent Application No. 2010-288102 filed on Dec. 24, 2010, the contents of which are incorporated herein by reference.

As described above, according to the first invention, since the cut pin having the same width as the width of the gate into the rib and the gate at the root part of the gate after the injection is completed to separate the rib from the gate, the lens can be obtained in which a dimensional control is more easily carried out than a usual method that the gate part is cut by the nipper and there is no fear of marring the ceiling.

What is claimed is:

1. A metal mold forming method for an indoor illuminating lamp lens for a motor vehicle using a metal mold having a cavity having a form of the indoor illuminating lamp lens to be provided with an entire surface as a designed part, the indoor illuminating lamp lens having a prescribed thickness and a rib in a back surface thereof, the lens having a lens control surface as a back surface of the thickness, the method comprising steps of:

providing a gate to the rib and the thickness;
    preparing a cut pin having a same width as a width of the gate;
    injecting a molten resin into the cavity of the metal mold from the gate;
    separating the rib from the gate by inserting the cut pin into the rib and through the gate at a root of the gate after the step of injecting is completed such that the cut pin forms a gate setting surface that is recessed away from the lens control surface and the gate setting surface interrupts the lens control surface; and
    taking out the lens from the metal mold by moving the cut pin backward after the step of separating is completed.

2. The metal mold forming method according to claim 1, wherein a crepe work is applied to an end of the cut pin.

3. The metal mold forming method according to claim 1, wherein
    the gate setting surface is formed by inserting the cut pin to a part of the thickness during a molding.

* * * * *